US008775540B2

(12) United States Patent
Yue (10) Patent No.: US 8,775,540 B2
(45) Date of Patent: Jul. 8, 2014

(54) UPON DETERMINING THAT A MESSAGE CELL OF A TIME LINE IS STILL VISIBLE ON A SCREEN AFTER A PREDEFINED TIME INTERVAL, DOWLOADING AN AVATAR OF AN AUTHOR OF THE MESSAGE CELL (75) Inventor: Shang Yue, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/702,950

(22) PCT Filed: Aug. 4, 2011

(86) PCT No.: PCT/CN2011/078023
§ 371 (c)(1),
(2), (4) Date: Dec. 21, 2012

(87) PCT Pub. No.: WO2012/028048
PCT Pub. Date: Mar. 8, 2012

(65) Prior Publication Data
US 2013/0151669 A1 Jun. 13, 2013

(30) Foreign Application Priority Data
Aug. 31, 2010 (CN) .......................... 2010 1 0272358

(51) Int. Cl.
G06F 15/16 (2006.01)
(52) U.S. Cl.
USPC .......................................................... 709/206
(58) Field of Classification Search
USPC ........................ 709/206; 715/835–38, 856–62
See application file for complete search history.

(56) References Cited

U.S. PATENT DOCUMENTS 7,953,451 B2 *  5/2011  Smith et al. .................... 455/566
8,275,736 B2 *  9/2012  Guo et al. ......................... 706/54
2001/0022861 A1 *  9/2001  Hiramatsu ..................... 382/291
(Continued)

FOREIGN PATENT DOCUMENTS

CN   101166313 A   4/2008
CN   101184275 A   5/2008
(Continued)

OTHER PUBLICATIONS

International Search Report for PCT/CN2011/078023 dated Nov. 10, 2011.
(Continued)

Primary Examiner — Lance L Barry
(74) Attorney, Agent, or Firm — Marshall, Gerstein & Borun LLP (57) ABSTRACT Method and apparatus for data transmission based on sliding detection are disclosed. The method includes: when it is detected that a TimeLine scrolls on a screen of a user device, recording, by a message client, application a Message Cell visible on the screen; and determining, by the message client application, whether the Message Cell is still visible on the screen after a predefined time interval; if the Message Cell is still visible, downloading, by the message client, data corresponding to the Message Cell from a message server. An apparatus for data transmission based on slide detection includes a detecting module, a recording module, a determining module and a downloading module. Thus, downloading is avoided for the data corresponding to Message Cells that enters into then slides out of the screen quickly. Network data traffic of users is reduced and user's experience is improved.

14 Claims, 5 Drawing Sheets

(56) References Cited

U.S. PATENT DOCUMENTS

| | | | |
|---|---|---|---|
| 2002/0126140 A1* | 9/2002 | Gorbet et al. | 345/708 |
| 2005/0114781 A1* | 5/2005 | Brownholtz et al. | 715/733 |
| 2006/0166708 A1* | 7/2006 | Kim et al. | 455/573 |
| 2007/0078965 A1* | 4/2007 | Shimamura et al. | 709/224 |
| 2007/0288247 A1* | 12/2007 | Mackay | 705/1 |
| 2008/0120384 A1* | 5/2008 | Bryant | 709/206 |
| 2009/0106687 A1 | 4/2009 | De Souza Sana et al. | |
| 2010/0031180 A1* | 2/2010 | Shin et al. | 715/771 |
| 2010/0138357 A1* | 6/2010 | Mufti-Bey | 705/36 R |
| 2010/0245358 A1* | 9/2010 | Heywood et al. | 345/440 |
| 2013/0151669 A1* | 6/2013 | Yue | 709/219 |
| 2013/0198642 A1* | 8/2013 | Carney et al. | 715/738 |

FOREIGN PATENT DOCUMENTS

| | | |
|---|---|---|
| CN | 101424997 A | 5/2009 |
| CN | 101588411 A | 11/2009 |
| CN | 101815087 A | 8/2010 |

OTHER PUBLICATIONS

Office Action from Chinese Application No. 201010272358.1 dated Sep. 4, 2013.

* cited by examiner

UPON DETERMINING THAT A MESSAGE CELL OF A TIME LINE IS STILL VISIBLE ON A SCREEN AFTER A PREDEFINED TIME INTERVAL, DOWLOADING AN AVATAR OF AN AUTHOR OF THE MESSAGE CELL

FIELD OF THE INVENTION

The present invention relates to network communication techniques, and more particularly, to a method and an apparatus for data transmission based on sliding detection.

BACKGROUND OF THE INVENTION

With development of network techniques, Internet has deeply rooted in network users' mind. Among most Internet applications, information propagation and sharing via message client applications have become an indispensable part of people's daily life. During a communication procedure based on a message client application, there are usually a lot of messages (such as text information, image information and audio/video information, etc.) need to be transmitted.

Microblog is an information transmission system adopting the above message client application. Microblog is an instant information sharing, propagation and obtaining platform based on relationships of users. Users may log on microblog client applications via devices such as cell phone, computer, etc., so as to realize information sharing.

Considering instantaneity of the microblog, cell phone becomes one of the most carriers of the microblog. When browsing microblog messages using a cell phone, a user usually performs some sliding operations. Thus, one message not displayed on the screen will slide into the screen.

In the microblog system, a message is usually carried by a message unit (Message Cell). Usually, each Message Cell may include message content, a name and an avatar of a message author, etc. Multiple Message Cells form a list or a table (TimeLine) according to their times and are displayed on the screen of the cell phone.

When the user performs the sliding operation, a Message Cell not displayed on the screen will slide into the screen. As to each Message Cell which slides into the screen during the sliding operation, the microblog client application needs to download the message content, the name and the avatar of the message author corresponding to the Message Cell.

When the user performs the sliding operation quickly and continuously, there will be a lot of Message Cells sliding into the screen and then sliding out of the screen again. Thus, the microblog client application has to download the message content, the name and the avatar of the message author corresponding to each Message Cell once slid into the screen. However, at this time, what the user cares about is not the Message Cells once slid into the screen during the quick and continuous sliding operation, but those Message Cells which are displayed on the screen when the sliding operation ends. Thus, large amounts of network resources are wasted in downloading the message content and/or avatar of the message author corresponding to the Message Cells sliding into the screen during the sliding operation, especially when the message content corresponding to the Message Cells contains large files such as image or audio/video data.

As to cell phone users who accessing the network based on data traffic charge, the above download procedure wastes a lot of traffic and brings bad user experience.

Similarly, as to computer users who access network via wireless manners such as 3G, the same problem also exists.

SUMMARY OF THE INVENTION

Examples of the present invention provide a method and an apparatus for data transmission based on slide detection, so as to reduce network data traffic and improve user's experience.

According to one embodiment of the present invention, a method for data transmission based on sliding detection is provided. The method includes:

detecting a TimeLine comprising a list of Message Cells scrolling on a screen of a user device, recording, by a message client application, a Message Cell visible on the screen; and determining, by the message client application, whether the Message Cell is still visible on the screen after a predefined time interval; if the Message Cell is still visible, downloading, by the message client application, data corresponding to the Message Cell from a message server.

According to another embodiment of the present invention, an apparatus for data transmission based on sliding detection is provided. The apparatus includes: a detecting module, a recording module, a determining module and a downloading module, wherein the detecting module is adapted to detect whether a TimeLine comprising a list of Message Cells scrolling on a screen of the user device;

the recording module is adapted to record a Message Cell visible on the screen when the detecting module detects that the TimeLine scrolls on the screen;

the determining module is adapted to determine whether the Message Cell is still visible on the screen after a predefined time interval;

the downloading module is adapted to download data corresponding to the Message Cell if the determining module determines that the Message Cell is still visible on the screen after the predefined time interval.

According to the method and apparatus provided by the embodiments of the present invention, only when the Message Cell stays on the screen for a predefined time interval, data corresponding to the Message Cell will be downloaded. Thus, it is possible to avoid downloading data corresponding to Message Cell which slides into the screen but then slides out quickly, thereby reducing network data traffic of users and improving user's experience.

DETAILED DESCRIPTION OF THE INVENTION

The present invention will be described in further detail hereinafter with reference to accompanying drawings and embodiments to make the subject matter and merits therein clearer.

The core idea of the present invention is as follows: when it is detected that a TimeLine is scrolling on a screen of a user device, a message client application records a Message Cell visible on the screen, and determines whether the Message Cell is still visible after a predefined time interval; if the Message Cell is still visible, the message client application downloads data corresponding to the Message Cell. Thus, it is possible to avoid downloading data corresponding to Message Cell which slides into the screen and then slides out quickly, so as to reduce network data traffic of the user and improve the user's experience.

Figure 1:
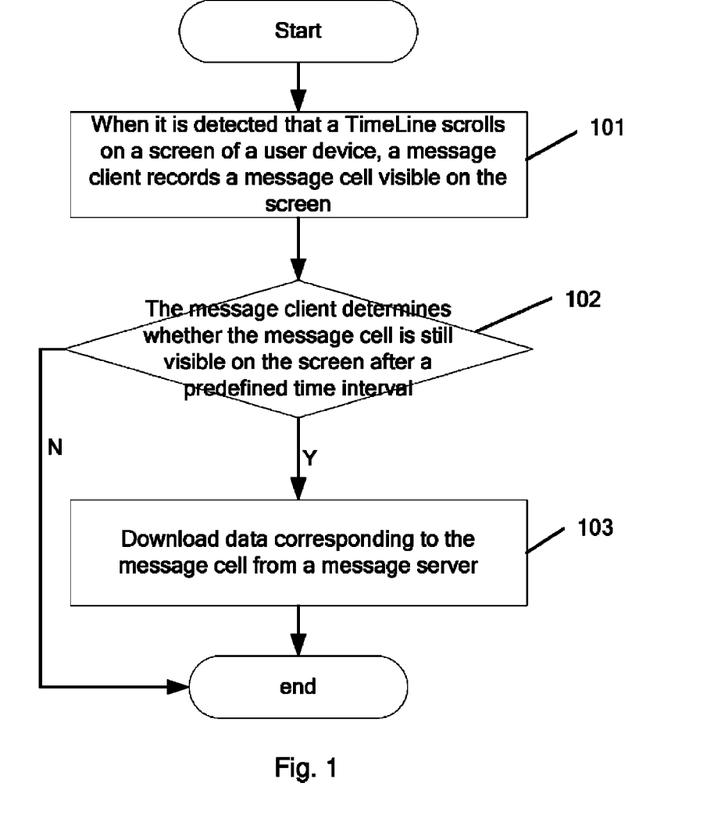
FIG. 1 is a flowchart illustrating a method for data transmission based on sliding detection according to one embodiment of the present invention.

FIG. 1 is a flowchart illustrating a method for data transmission based on sliding detection according to an embodiment of the present invention. As shown in FIG. 1, the method includes the following steps.

Step 101, when it is detected that a TimeLine is scrolling on a screen of a user device, a message client application records a Message Cell visible on the screen.

Step 102, the message client application determines whether the Message Cell is still visible after a predefined time interval. If the Message Cell is still visible, proceed to step 103; otherwise, the procedure ends.

Step 103, data corresponding to the Message Cell is downloaded from a message server.

The user device may be a cell phone or a computer or other devices. The message client application may be a microblog client application. Accordingly, the message server may be a microblog server. The data corresponding to the Message Cell may be image, or audio/video files contained in message content corresponding to the Message Cell, or an avatar of a message author corresponding to the Message Cell.

Hereinafter, the method for data transmission based on sliding detection will be described in further detail with reference to the following example, in which the user logs on a microblog client application through a cell phone and the data corresponding to the Message Cell is the avatar of the message author.

Figure 2:
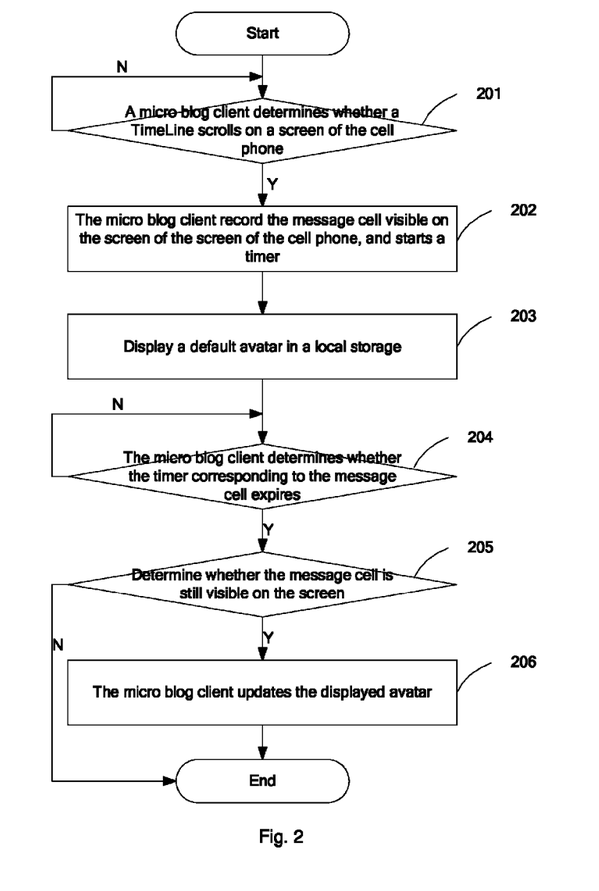
FIG. 2 is a flowchart illustrating a method for data transmission based on sliding detection according to another embodiment of the present invention.

FIG. 2 is a flowchart illustrating a method for data transmission based on sliding detection according to an embodiment of the present invention. As shown in FIG. 2, the method includes the following steps.

Step 201, the microblog client application detects whether a TimeLine is scrolling on the screen of the cell phone. If it is detected that the TimeLine is scrolling on the screen, the process proceeds to step 202; otherwise, repeats step 201.

Take iphone as an example, the TimeLine acting as a controller, will take a scroll view controller provided by an ios system of iphone as a carrier. When the TimeLine begins scrolling, the ios system will trigger a view scroll begin event to notify the microblog client application that the scroll view begins to scroll. When the scroll stops, the ios system will trigger a view scroll stop event to notify the microblog client application that the scroll view stops scrolling. Thus, the microblog client application may know whether the TimeLine scrolls on the screen of the cell phone. Particularly, in the ios system of iphone, the scroll view controller may be scrollview, the view scroll begin event may be scrollviewDidscroll, and the view scroll stop event may be scrollviewDidEndDecelerating.

Those with ordinary skill in the art may adopt others methods to detect whether the TimeLine is scrolling on the screen according to a practical situation. The detailed detecting method is not restricted in the present invention.

Step 202, the microblog client application records the Message Cell which is visible on the screen and starts a timer.

Take iphone again as an example. When a Message Cell comes into the screen, the ios system will trigger an event to notify the microblog client application. After being notified, the microblog client application may determine whether the Message Cell is visible on the screen. Specifically, the event may be cellForRowAtIndexPath. At this time, the microblog client application records an identifier of the Message Cell and starts a timer. When a message Cell slides out of the screen, the ios system will also notify the microblog client application. After being notified, the microblog client application may determine whether the Message Cell slides out of the screen.

In this step, along with the scrolling of the TimeLine, there may be multiple Message Cells visible on the screen. The microblog client application records the identifier of each Message Cell and starts a timer corresponding to each Message Cell when the Message Cell comes into the screen.

For example, when the TimeLine scrolls on the screen, Message Cell 1 firstly comes into the screen. At this time, the microblog client application records identifier ID1 corresponding to Message Cell 1 and starts a timer T1 corresponding to Message Cell 1. Then, with the scrolling of the TimeLine, Message Cell 2 comes into the screen. At this time, the microblog client application records identifier ID2 corresponding to Message Cell 2 and starts a timer T2 corresponding to Message Cell 2, and so on.

The identifiers corresponding to the Message Cells visible on the screen may be stored in an array. For example, at a certain time, Message Cells visible on the screen include Message Cell 1, Message Cell 2 and Message Cell 3. Thus, the array includes ID1, ID2 and ID3. At another time, with the scroll of the TimeLine, Message Cell 1 slides out of the screen and Message Cell slides into the screen. At this time, the array includes ID2, ID3 and ID4.

Step 203, display a default avatar stored in a local storage.

In particular, the microblog client application may determine whether the local storage stores the avatar of the author corresponding to the Message Cell. If there is, the default avatar is the avatar of the author corresponding to the Message Cell. At this, time, the microblog client application displays the avatar of the author corresponding to the Message Cell in the local storage. If the local storage does not store the avatar of the author corresponding to the Message Cell, the microblog client application may display a system default avatar in the local storage.

Step 204, the microblog client application determines whether the timer corresponding to the Message Cell expires. If the timer expires, the process proceeds to step 205; otherwise, repeats step 204.

In this step, the time length of the timer may be configured according to a practical situation. For example, the time length may be configured as 0 to 1 second. At this time, there may be a better visual effect.

In addition, the timers of different Message Cells may have the same or different time lengths.

If the microblog client records multiple Message Cells and starts multiple timers in step 202, the microblog client application needs to determine whether the timer corresponding to each Message Cell expires respectively in this step.

Step 205, it is determined whether the Message Cell is still visible on the screen. If the Message Cell is still visible, the process proceeds to step 206; otherwise, the procedure ends.

In particular, the microblog client application may determine whether the Message Cell is still visible through determining whether the array contains the identifier corresponding to the Message Cell.

For example, as to Message Cell 1, if the timer T1 corresponding to Message Cell 1 expires, the microblog client application determines whether the array still contains ID1 corresponding to Message Cell 1. If the array contains ID1, it indicates that Message Cell 1 is still visible on the screen; otherwise, it indicates that Message Cell 1 is invisible on the screen, i.e. Message Cell 1 has slid out of the screen.

Step 206, the microblog client application updates the displayed avatar.

If the microblog client application determines, in step 203, that the local storage stores the avatar of the author corresponding to the Message Cell, the microblog client application determines whether a downloading address of the avatar of the author corresponding to the Message Cell is the same with a downloading address stored in local storage. If they are the same, it indicates that the avatar of the author corresponding to the Message Cell is not updated, the procedure ends. If they are not the same, it indicates that the avatar of the author corresponding to the Message Cell is updated. Then the microblog client application downloads a new avatar from the microblog server, and displays the new avatar so as to replace the avatar stored in the local storage and displayed in step 203.

If it is determined that the local storage does not store the avatar of the author corresponding to the Message Cell in step 203, the microblog client application directly downloads the avatar of the author corresponding to the Message Cell from the microblog server, and displays the downloaded avatar so as to replace the default avatar displayed in step 203.

It can be seen from the above technical solution that, only when the Message Cell stays within the screen for a predefined time interval, it is triggered to download the avatar of the author corresponding to the Message Cell. Thus, it is possible to avoid downloading the avatars of authors corresponding to the Message Cells which slide into the screen and then slide out of the screen quickly, so as to reduce network data traffic of the user.

Figure 3:
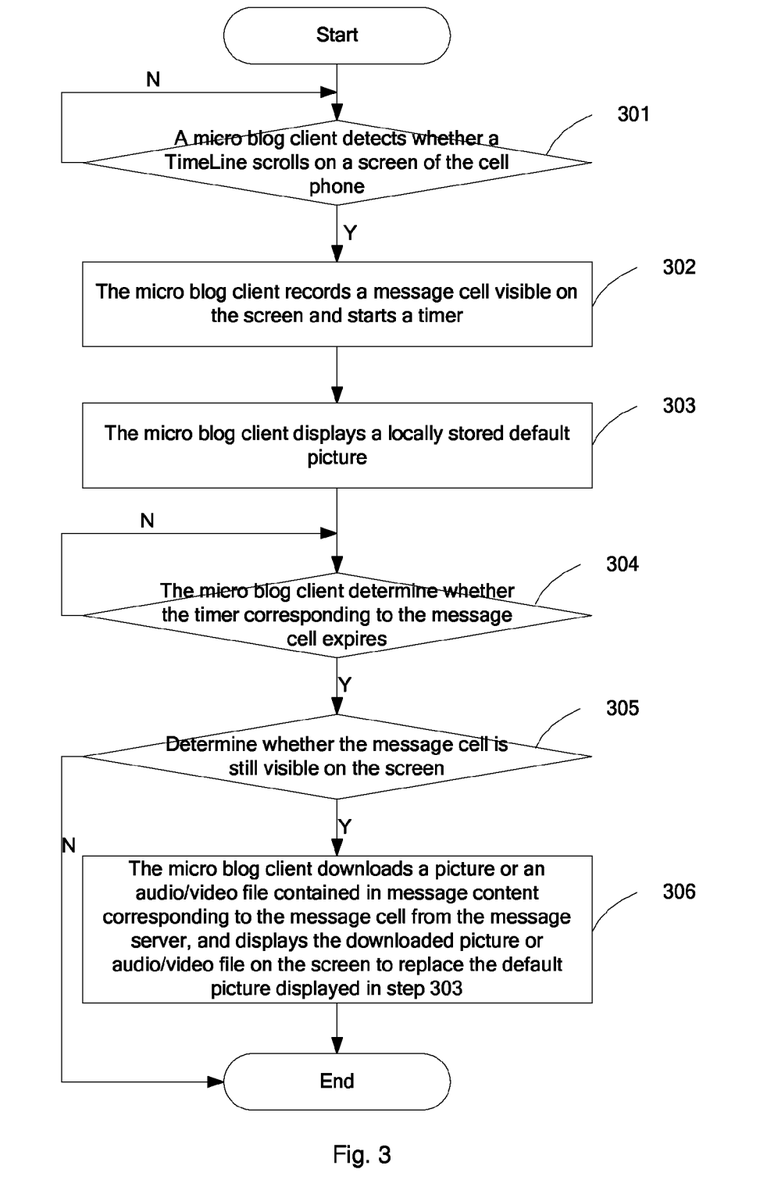
FIG. 3 is a flowchart illustrating a method for data transmission based on sliding detection according to another embodiment of the present invention.

In addition, in the present invention, the data corresponding to the Message Cell may also be image, audio/video files in message content corresponding to the Message Cell. FIG. 3 is a flowchart illustrating a method for data transmission based on slide detection according to another embodiment of the present invention. In this embodiment, the same example will be referred to in which a user logs on a microblog client application using a cell phone. As shown in FIG. 3, the method includes the following steps.

Step 301-302 are the same as step 201-202.

Step 303, the microblog client application displays a default image stored in the local storage.

Step 304-305 are the same as step 204-205.

Step 306, the microblog client application downloads an image or audio/video file contained in message content corresponding to the Message Cell from a microblog server, and displays the downloaded image or audio/video file on the screen so as to replace the default image displayed in step 303.

Thus, if the Message Cell slides out of the screen quickly, downloading the large file may be avoided, thereby the network data traffic of the user may be reduced.

The above describes the method for data transmission based on sliding detection provided by the present invention. Hereinafter, the apparatus for data transmission based on sliding detection will be described in detail with reference to accompanying drawings and embodiments.

Figure 4:
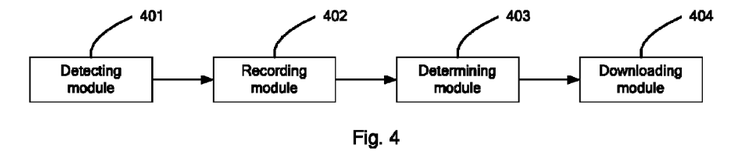
FIG. 4 is a schematic diagram illustrating a structure of an apparatus for data transmission based on sliding detection according to an embodiment of the present invention.

FIG. 4 is a schematic diagram illustrating a structure of an apparatus for data transmission based on sliding detection according to an embodiment of the present invention. As shown in FIG. 4, the apparatus includes: a detecting module 401, a recording module 402, a determining module 403 and a downloading module 404.

The detecting module 401 is adapted to detect whether a TimeLine scrolls on a screen of a user device.

The recording module 402 is adapted to record a Message Cell visible on the screen when the detecting module 401 detects that the TimeLine is scrolling on the screen.

The determining module 403 is adapted to determine whether the Message Cell recorded by the recording module 402 is still visible after a predefined time interval.

The downloading module 404 is adapted to download data corresponding to the Message Cell from a message server if the determining module 403 determines that the Message Cell is still visible on the screen after the predefined time interval.

Specifically, the apparatus of the present invention may be a microblog client application. Accordingly, the message server may be a microblog server. The data corresponding to the Message Cell may be an image, or an audio/video file contained in message content corresponding to the Message Cell, or an avatar of a message author corresponding to the Message Cell.

Hereinafter, suppose the apparatus is a microblog client application installed in a cell phone and the data corresponding to the Message Cell is the avatar of the message author. The apparatus for data transmission based on sliding detection will be described in further detail with reference to the following embodiments.

Figure 5:
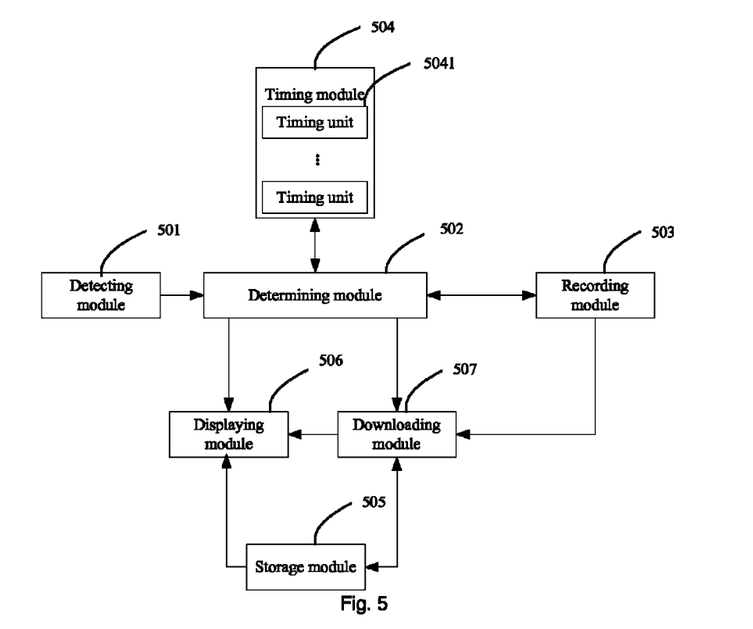
FIG. 5 is a schematic diagram illustrating a structure of an apparatus for data transmission based on sliding detection according to another embodiment of the present invention.

FIG. 5 is a schematic diagram illustrating a structure of an apparatus for data transmission based on sliding detection according to an embodiment of the present invention. As shown in FIG. 5, the apparatus includes: a detecting module 501, a determining module 502, a recording module 503, a timing module 504, a storage module 505, a displaying module 506 and a downloading module 507.

The detecting module is adapted to detect whether a TimeLine scrolls on the screen of the cell phone. If it is detected that the TimeLine is scrolling on the screen, the detecting module 501 notifies the determining module 502; otherwise, the detecting module 501 repeats the detection.

The determining module 502 is adapted to determine, after being notified by the detecting module 501, whether a Message Cell slides into the screen, transmits an entry notification to the recording module 503 and the displaying module 506 if the Message Cell slides into the screen, and triggers the timing module 504 to start timing. In addition, the determining module 502 is further adapted to determine whether the Message Cell slides out of the screen, and transmit a leave notification to the recording module 503 if the Message Cell leaves the screen.

The recording module 503 is adapted to record, after receiving the entry notification from the determining module 502, an identifier of the Message Cell that slides into the screen of the cell phone. Specifically, the recording module 503 may record the identifier of the Message Cell in an array. When there are multiple Message Cells sliding into the screen of the cell phone, the array is used for recording the identifier of each Message Cell. In addition, the recording module 503 is further adapted to delete the identifier of the Message Cell from the array after receiving the leave notification from the determining module 502.

The timing module 504 is adapted to start timing under the trigger of the determining module 502. Specifically, the timing module 504 may include a plurality of timing units, respectively correspond to multiple Message Cells recorded by the recording module 503. For example, if Message Cell 1 slides into the screen, the timing unit 5041 corresponding to Message Cell 1 starts timing.

When timing module 504 times out, the determining module 502 determines whether the Message Cell is still visible on the screen. Specifically, the determining module 502 may transmit a query message to the recording module 503. After receiving the query message, the recording module 503 determines whether the array records the identifier of the Message Cell and returns a query result to the determining module 502. If the query result indicates that the array records the identifier of the Message Cell, the determining module 502 may determine that the Message Cell is still visible on the screen; otherwise, the determining module 502 may determine that the Message Cell is invisible on the screen, i.e. the Message Cell has slid out of the screen.

The storage module 505 is adapted to store a default avatar and a downloaded avatar downloaded by the downloading module 507. Specifically, if the storage module 505 stores the avatar of the author corresponding to the Message Cell, the default avatar is the avatar of the author corresponding to the Message Cell stored by the storage module 505. If the storage module 505 does not store the avatar of the author corresponding to the Message Cell, the default avatar is a system default avatar stored in the storage module 505.

The downloading module 507 is adapted to determine, when the determining module 502 determines that the Message Cell is still visible on the screen after the timing module 504 times out, whether the storage module 505 stores the avatar of the author corresponding to the Message Cell, to determine whether the avatar of the author corresponding to the Message Cell is updated if the storage module 505 stores the avatar, and to download an updated avatar from the microblog server if the avatar is updated and transmit the downloaded avatar to the storage module 505 and the displaying module 506; if the storage module 505 does not store the avatar of the author corresponding to the Message Cell, the downloading module 507 is adapted to download the avatar of the author corresponding to the Message Cell from the microblog server, and transmit the downloaded avatar to the storage module 505 and the displaying module 506.

The displaying module 506 is adapted to display, when receiving the entry notification from the determining module 502, the default avatar stored in the storage module 505, and to display the avatar received from the downloading module 507 to replace the default avatar when receiving the avatar transmitted by the downloading module 507.

Figure 6:
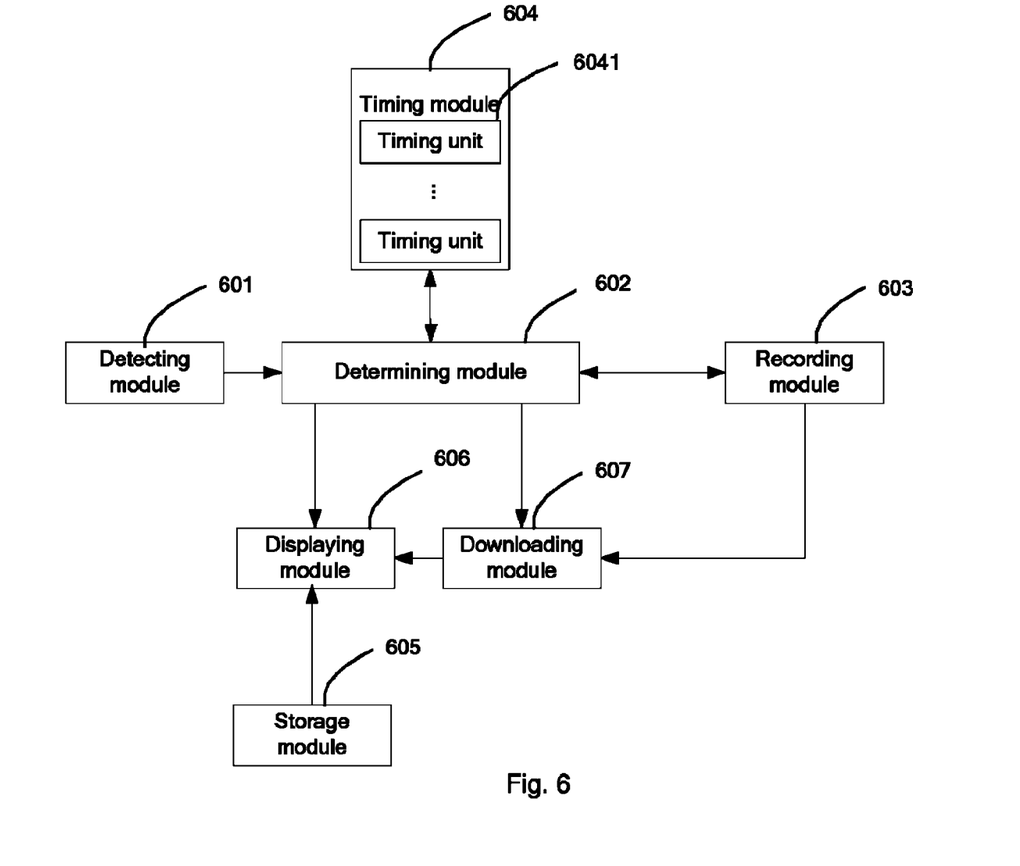
FIG. 6 is a schematic diagram illustrating a structure of an apparatus for data transmission based on sliding detection according to another embodiment of the present invention.

In addition, corresponding to the embodiment shown in FIG. 3, an embodiment of the present invention further provides another apparatus for data transmission based on sliding detection. As shown in FIG. 6, the apparatus includes: a detecting module 601, a determining module 602, a recording module 603, a timing module 604, a storage module 605, a displaying module 606 and a downloading module 607.

The functions of the detecting module 601, the determining module 602, the recording module 603 and the timing module 604 are similar with the corresponding modules in FIG. 5 and will not be repeated herein.

The downloading module 607 is adapted to download an image or an audio/video file contained in message content corresponding to the Message Cell from the microblog server when the determining module 602 determines that the Message Cell is still visible on the screen, and transmit the image or audio/video to the displaying module 606.

The displaying module 606 is adapted to display the default image stored by the storage module 605 when receiving the entry notification of the determining module 602, and display the image or audio/video file received from the downloading module 607 to replace the default image when receiving the image or audio/video file transmitted by the downloading module 607.

In the above embodiments, only the situation that the user logs on the microblog client application through a cell phone is taken as an example. It should be noted that, the present invention is not restricted to this situation.

According to the method and apparatus provided by the embodiments of the present invention, only when the Message Cell stays on the screen for a predefine time, data corresponding to the Message Cell will be downloaded. Thus, it is possible to avoid downloading data corresponding to Message Cells which slide into the screen but then slide out quickly, thereby reducing network data traffic of users and improving user's experience.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for data transmission based on detection of sliding, the method comprising:
   when detecting a TimeLine comprising a list of Message Cells scrolling on a screen of a user device, recording, by a message client application, a Message Cell visible on the screen; and
   determining, by the message client application, whether the Message Cell is still visible on the screen after a predefined time interval; if the Message Cell is still visible, downloading, by the message client application, data corresponding to the Message Cell from a message server,
   wherein the data corresponding to the Message Cell is an avatar of an author corresponding to the Message Cell, and
   wherein the downloading the avatar of the author corresponding to the Message Cell from the message server comprises,
   determining, by the message client application, whether the avatar of the author corresponding to the Message Cell is stored locally in the message client application,
   if the avatar of the author corresponding to the Message Cell is stored locally in the message client application, determining, by the message client application, whether the avatar of the author corresponding to the Message Cell is updated, if the avatar is updated, downloading, by the message client application, an updated avatar from the message server, and
   if the avatar of the author corresponding to the Message Cell is not stored locally in the message application, downloading, by the message client, the avatar of the author corresponding to the Message Cell from the message server.

2. The method of claim 1, wherein the recording the Message Cell visible on the screen comprises:
   recording an identifier of the Message Cell when the Message Cell enters a displaying area of the screen; and deleting the identifier of the Message Cell when the Message Cell leaves the displaying area of the screen.

3. The method of claim 2, further comprising:
after the Message Cell enters the displaying area of the screen, displaying default data stored in a local storage of the message client application on the screen.

4. The method of claim 2, wherein the determining whether the Message Cell is still visible on the screen after a predefined time interval comprises:
after the predefined time interval, determining whether the identifier of the Message Cell is recorded in the message client application, if the identifier of the Message Cell is recorded in the message client application, determining that the Message Cell is still visible on the screen after the predefined time interval.

5. An apparatus for data transmission based on detection of sliding, applied to a user device, comprising:
a detecting module, a recording module, a determining module, a downloading module, a storage module, and a displaying module each module stored on a memory and executable by a processor, wherein
the detecting module is configured to detect whether a TimeLine comprising a list of Message Cells scrolling on a screen of the user device;
the recording module is configured to record a Message Cell visible on the screen when the detecting module detects the TimeLine scrolling on the screen;
the determining module is configured to determine whether the Message Cell is still visible on the screen after a predefined time interval;
the downloading module is configured to download data corresponding to the Message Cell if the determining module determines that the Message Cell is still visible on the screen after the predefined time interval, wherein the data corresponding to the Message Cell is an avatar of an author corresponding to the Message Cell; and
wherein the storage module is configured to store a default avatar and an avatar downloaded by the downloading module;
wherein the downloading module is further configured to determine, when the determining module determines that the Message Cell is still visible on the screen after the predefined time interval, whether the avatar of the author corresponding to the Message Cell is stored in the storage module, if the avatar of the author corresponding to the Message Cell is stored in the storage module, the downloading module is configured to determine whether the avatar of the author corresponding to the Message Cell is updated, if the avatar is updated, download an updated avatar from the message server and transmit the downloaded avatar to the storage module and the displaying module; if the avatar of the author corresponding to the Message Cell is not stored in the storage module, the downloading module is configured to download the avatar of the author corresponding to the Message Cell from the message server, and transmit the downloaded avatar to the storage module and the displaying module; and
wherein the displaying module is configured to display the default avatar stored in the storage module when receiving the entry notification transmitted by the determining module, and display the downloaded avatar received from the downloading module to replace the default avatar when receiving the downloaded avatar from the downloading module.

6. The apparatus of claim 5, wherein the determining module is further configured to determine whether the Message Cell enters a displaying area of the screen, transmit an entry notification to the recording module if the Message Cell enters the displaying area of the screen, and configured to determine whether the Message Cell leaves the displaying area of the screen, and transmit a leave notification to the recording module if the Message Cell leaves the displaying area of the screen.

7. The apparatus of claim 6, wherein the recording module is further configured to record an identifier of the Message Cell when receiving the entry notification transmitted by the determining module, and delete the identifier of the Message Cell when receiving the leave notification transmitted by the determining module.

8. The apparatus of claim 6, wherein the determining module is further configured to transmit a query message to the recording module requesting the recording module to determine whether the identifier of the Message Cell is recorded in the recording module, and receive a query result returned by the recording module, determine that the Message Cell is still visible on the screen after the predefined time interval if the query result indicates that the identifier of the Message Cell is recorded in the recording module.

9. A non-transitory computer-readable storage medium comprising a set of instructions for data transmission based on detection of sliding, the set of instructions to direct at least one processor to perform acts of:
when detecting a TimeLine comprising a list of Message Cells scrolling on a screen of a user device, recording, by a message client application, a Message Cell visible on the screen; and
determining whether the Message Cell is still visible on the screen after a predefined time interval; if the Message Cell is still visible, downloading data corresponding to the Message Cell from a message server;
wherein the data corresponding to the Message Cell is an avatar of an author corresponding to the Message Cell;
wherein the downloading the avatar of the author corresponding to the Message Cell from the message server comprises,
determining whether the avatar of the author corresponding to the Message Cell is stored locally in the message client application,
if the avatar of the author corresponding to the Message Cell is stored locally in the message client application, determining whether the avatar of the author corresponding to the Message Cell is updated, if the avatar is updated, downloading an updated avatar from the message server, and
if the avatar of the author corresponding to the Message Cell is not stored locally in the message application, downloading the avatar of the author corresponding to the Message Cell from the message server.

10. The non-transitory computer-readable storage medium of claim 9, wherein the recording the Message Cell visible on the screen comprises:
recording an identifier of the Message Cell when the Message Cell enters a displaying area of the screen; and deleting the identifier of the Message Cell when the Message Cell leaves the displaying area of the screen.

11. The non-transitory computer-readable storage medium of claim 10, further comprising:
after the Message Cell enters the displaying area of the screen, displaying default data stored in a local storage of the message client application on the screen.

12. The non-transitory computer-readable storage medium of claim 10, wherein the determining whether the Message Cell is still visible on the screen after a predefined time interval comprises:
- after the predefined time interval, determining whether the identifier of the Message Cell is recorded in the message client application, if the identifier of the Message Cell is recorded in the message client application, determining that the Message Cell is still visible on the screen after the predefined time interval.

13. A method for data transmission based on detection of sliding, comprising:
- when detecting a TimeLine comprising a list of Message Cells scrolling on a screen of a user device, recording, by a message client application, a Message Cell visible on the screen; and
- determining, by the message client application, whether the Message Cell is still visible on the screen after a predefined time interval; if the Message Cell is still visible, downloading, by the message client application, data corresponding to the Message Cell from a message server;
- wherein the data corresponding to the Message Cell is an avatar of an author corresponding to the Message Cell;
- wherein the downloading the avatar of the author corresponding to the Message Cell from the message server comprises,
- determining, by the message client application, whether the avatar of the author corresponding to the Message Cell is stored locally in the message client application, and
- if the avatar of the author corresponding to the Message Cell is stored locally in the message client application, determining, by the message client application, whether the avatar of the author corresponding to the Message Cell is updated, if the avatar is updated, downloading, by the message client application, an updated avatar from the message server.

14. The method of claim 13, further comprising:
- if the avatar of the author corresponding to the Message Cell is not stored locally in the message application, downloading, by the message client, the avatar of the author corresponding to the Message Cell from the message server.

* * * * *